United States Patent
Mahy

[19]

[11] Patent Number: 5,878,195

[45] Date of Patent: Mar. 2, 1999

[54] COLOR SEPARATION METHOD AND APPARATUS FOR SAME

[75] Inventor: Marc Mahy, Wilsele, Belgium

[73] Assignee: Agfa-Gevaert N.V., Mortsel, Belgium

[21] Appl. No.: 711,730

[22] Filed: Sep. 3, 1996

[30] Foreign Application Priority Data

Sep. 15, 1995 [EP] European Pat. Off. .............. 95202499

[51] Int. Cl.⁶ .............................. G06F 15/00; H04N 1/46; G03F 3/08

[52] U.S. Cl. .......................... 395/109; 395/106; 358/500; 358/515; 358/518; 358/519; 358/530; 382/162

[58] Field of Search ..................................... 358/500, 518, 358/519, 520, 515, 525, 298, 501, 461, 530; 395/106, 109; 382/162, 167

[56] References Cited

U.S. PATENT DOCUMENTS

| | | | |
|---|---|---|---|
| 5,149,960 | 9/1992 | Dunne et al. | 250/226 |
| 5,563,724 | 10/1996 | Boll et al. | 358/518 |
| 5,606,432 | 2/1997 | Ohtsuka et al. | 358/501 |
| 5,689,350 | 11/1997 | Rolleston | 358/518 |
| 5,692,071 | 11/1997 | Govaert | 358/523 |

*Primary Examiner*—Edward L. Coles
*Assistant Examiner*—Mark Wallerson
*Attorney, Agent, or Firm*—John A. Merecki

[57] ABSTRACT

A colorant selection method and apparatus for a color reproduction device. The colorant selection method and apparatus is capable of finding all the sets of colorants that yield a specific color. Once all the sets of colorants have been found, one of the sets of colorants is selected and used by the color reproduction device to render the specific color.

12 Claims, 5 Drawing Sheets

COLOR SEPARATION METHOD AND APPARATUS FOR SAME

DESCRIPTION

1. Field of the Invention

The present invention relates to devices and methods for image rendering by means of color reproduction devices.

2. Background of the Invention

The independent values with which the color device can be addressed are called colorants or inks. For the purpose of generality, the values for these colorants can always be scaled to range from 0 to 100%. A color reproduction device with n colorants is called a printer or an n-ink process.

With colorant space is meant an n-dimensional space with n the number of independent variables with which the printer can be addressed. In the case of an offset printing press, for example, the dimension of the space corresponds with the number of inks of the printer.

With color space is meant a space that represents a number of quantities of an object that characterize its color. In most practical situations, colors will be represented in a 3-dimensional space such as the CIE XYZ space. However, also other characteristics can be used such as multispectral values based on filters that are not necessarily based on a linear transformation of the color matching functions to represent color. A typical example is an n-dimensional space of which the axes correspond to densities.

With colorant gamut or colorant domain is meant the delimited region in colorant space of colorant combinations that are physically realizable by a given printer, taking into account possible extra limitations on colorant combinations. In this invention it is supposed that colorant limitations can preferentially be specified by mathematical formulas that describe the boundaries of the desired colorant gamut.

The colorant gamut of a cmyk offset printing press for example is often delimited by a linear condition that limits the sum of the four colorants (for example to 340%).

A printer model is a mathematical relation that expresses color values as a function of colorants for a given printer. The variables of the colorants are denoted as $C_1, C_2, \ldots, C_n$ with n being the dimension of the colorant space.

A printer or n-ink process is completely characterized by its colorant gamut with a number of colorant limitations and the printer model. By inverting the printer or the n-ink process is meant that the printer model is inverted. If an n-ink process is given with colorant limitations in the colorant domain and if an m-ink process is deduced from this n-ink process by setting n−m colorants to constant values in the printer model of the n-ink process, the colorant limitations are inherited by this m-ink process if the colorant gamut of the m-ink process is restricted by colorant limitations obtained by setting the n−m colorants in the colorant limitations of the colorant gamut of the n-ink process to their constant values.

Extracting an m-ink process out of an n-ink process with m<n, means that n−m out of the n colorants in the printer model are replaced by a constant value. The colorants of such an m-ink process vary between the minimum and maximum values they can have according to the colorant gamut of the n-ink process and the colorant limitations are not inherited by the m-ink process. The m-ink process is called the extracted m-ink process of the n-ink process.

If an m-ink process is extracted from an n-ink process, and the n−m out of the n colorants in the printer model of the n-ink process are replaced by their minimum or maximum value as defined by the colorant gamut of the n-ink process, the m-ink process is called an extracted boundary m-ink process of the n-ink process. In general there are $$\frac{n!}{(n-m)!m!} 2^{n-m}$$

extracted boundary m-ink processes of an n-ink process. The colorants in the colorant gamut of an extracted boundary m-ink process vary between the minimum and maximum values they can have according to the colorant gamut of the n-ink process and the colorant limitations are not inherited by the m-ink process. With color gamut is meant a delimited region in color space, containing colors that are physically realizable by a given printer, taking into account possible extra colorant limitations. Typical devices we have in mind are offset or gravure printing presses, thermal dye sublimation processes, thermal wax transfer processes, electrophotographic processes and many other processes. Nevertheless, the invention can also be applied to other color reproduction devices such as color displays, color photography or film recorders.

A typical printer is capable of laying down various amounts of cyan, magenta and yellow colorants. The modulation of these various amounts can be done by altering the concentration of the dye that is laid down onto the substrate or by means of one of the halftoning techniques, an overview of which is found in the article by J. C. Stoffel and J. F. Moreland "A survey of Electronic Techniques for Pictorial Reproduction", IEEE Transactions on Communications, Vol. COM-29, No. 12, Dec. 1981. More and updated information on halftoning is found in the patent literature and a list of recommended patents is found in the article by Peter R. Jones, "Evolution of halftoning technology in the U.S. patent literature", Journal of Electronic Imaging 3(3), 257–275, Jul. 1994.

The calculation of the correct amounts of colorant for the rendering of color images on a printer is called the color separation problem. Most of the color separation strategies known in the art comprise the following steps:

In a first step, the relation between the amounts of colorants and the resulting colors on a printer is characterized. This is done by first printing a set of colorant combinations that spans the dynamic range of the printer and measuring the resulting colors. An example of such a set is the ANSI IT8.7/3 form.

In a second step this relation is mathematically modeled, to obtain the printer model. The printer model consists of some form of an analytical expression that predicts color for a given combination of colorant amounts. A well known mathematical model is the set of "Neugebauer equations".

In a third step the printer model is inverted. This is necessary as the color separation problem is involved with finding a set of colorants that renders a given color and not vice versa. Model inversion is usually done by means of some iterative search strategy, such as the Newton Raphson iteration.

A difficulty is that many colors that can occur in photographic images are not reproducible at all by a given printer and hence that no physically realizable set of colorants can be found to render these colors. The solution to this problem consists of first converting the "non reproducible color" into a "reproducible color". Up till now there exists no universally accepted strategy to achieve this goal, and the evaluation of any such strategy is therefore necessarily based on aesthetic and therefore subjective judgment. A discussion of strategies to deal with the problem is found in the article by Jim Gordon "On the rendition of unprintable colors", 1987 Proceedings of the Technical Association of the Graphic Arts, pp. 186–195.

Because it will help to understand the problems in the prior art, a few more words of explanation are given on the Neugebauer equations for a 3-ink process and a few methods are presented that are currently in use for their inversion. The generalization of the Neugebauer process for n inks is straightforward.

The Neugebauer equations for a 3-ink process.

The printing with three inks and three halftone screens results theoretically in 8 possible combinations of ink overlap. The Neugebauer expressions predict the resulting color as a linear function of the colors of these combinations. The Neugebauer equation for the X tristimulus value in a 3-ink process is:

$$X(C_1,C_2,C_3)=a_w X_w+a_1 X_1+a_2 X_2+a_3 X_3+a_{23} X_{23}+a_{13} X_{13}+a_{12} X_{12}+a_{123} X_{123}$$

The terms $X_{ijk}$ in the above equation are the X tristimulus values of the corresponding overprints. The Neugebauer expression for the Y and Z tristimulus values are obtained by replacing the X tristimulus values by the corresponding Y and Z values respectively. If it is assumed that the relative positions of the halftone dots is random, the Neugebauer coefficients can be calculated from the Demichel equations that predict the fraction of each combination of the three inks as a function of their respective dot percentages $c_1$, $c_2$ and $c_3$:

$$a_w=(1-c_1)(1-c_2)(1-c_3)$$

$$a_1=(c_1)(1-c_2)(1-c_3)$$

$$a_2=(1-c_1)(c_2)(1-c_3)$$

$$a_3=(1-c_1)(1-c_2)(c_3)$$

$$a_{23}=(1-c_1)(c_2)(c_3)$$

$$a_{13}=(c_1)(1-c_2)(c_3)$$

$$a_{12}=(c_1)(c_2)(1-c_3)$$

$$a_{123}=(c_1)(c_2)(c_3)$$

Substitution of the Demichel equations in the Neugebauer equations and rearranging the terms leads to the following representation of the three Neugebauer equations for a 3-ink process:

$$X=k_0+k_1 c_1+k_2 c_2+k_3 c_3+k_{12} c_1 c_2+k_{13} c_1 c_3+k_{23} c_2 c_3+k_{123} c_1 c_2 c_3$$

$$Y=l_0+l_1 c_1+l_2 c_2+l_3 c_3+l_{12} c_1 c_2+l_{13} c_1 c_3+l_{23} c_2 c_3+l_{123} c_1 c_2 c_3$$

$$Z=m_0+m_1 c_1+m_2 c_2+m_3 c_3+m_{12} c_1 c_2+m_{13} c_1 c_3+m_{23} c_2 c_3+m_{123} c_1 c_2 c_3$$

These equations predict the XYZ tristimulus values as a function of the amounts of the three colorants $c_1$, $c_2$ and $c_3$.

Interpretation of the Neugebauer equations

It is worthwhile to consider a number of different mathematical interpretations of the Neugebauer equations.

According to a first interpretation, the Neugebauer equations can be seen as a set of three (one for X, Y and Z) trilinear interpolation formulas. This becomes immediately clear by looking at the form of the coefficients of the Neugebauer equations. These coefficients result in exact predictions of X, Y and Z for values of $c_1$, $c_2$ and $c_3$ when they are 0 or 100%, and in trilinearly interpolated values for other values. If the Neugebauer equations are used as multilinear interpolation formulas, they can be used to model any color device in any color space.

Instead of using coefficients that make the Neugebauer equations exact for 8 colors, it is sometimes desirable to have coefficients that minimize the error (for example in terms of "least mean square") over a large set of colors. In that case a regression technique can be used to obtain the Neugebauer coefficients. The equations in that case have the nature of an "interpolating polynomial".

An interesting observation is that for a given X, Y and Z, each of the three Neugebauer equations represents a "surface" in the 3-dimensional $c_1$, $c_2$, $c_3$ space. As FIG. 1 shows, can the solution of the Neugebauer equations for a given X, Y and Z value be seen as the intersection between the three surfaces that correspond to these values.

Improving the precision of the Neugebauer equations

Real printing processes seldom behave exactly according to the physical model on which the Neugebauer equations are based, and this explains the deviations that can occur between the predicted and measured color for a given colorant combination.

The interpretation of the Neugebauer equations as an interpolating polynomial leads to the introduction of additional higher order terms to improve their precision. In theory it is possible to increase the number of terms until any desired precision (in terms of "least mean square error") is obtained, but practical arguments such as numerical stability and the amount of computation needed for the calculation of large sets of coefficients from large sets of data put constraints on the achievable precision.

An alternative approach, and this is our preferred one, is to "localize" the coefficients of the Neugebauer printer model, and this leads to a "piece-wise" interpolation approach known under the name of the localized or cellular Neugebauer equations (LNE). The different subdomains are called the Neugebauer cells. In FIG. 2 the colorant domain of a cmy process is presented that is divided into 8 Neugebauer cells. Per Neugebauer cell, the printer is modeled with a 3-ink Neugebauer process.

Various other modifications of the Neugebauer model have also been suggested to improve their precision, among which the n-modified and the spectral Neugebauer equations are cited. These and other models are discussed in the overview article by R. Rolleston and R. Balasubramanian "Accuracy of various Types of Neugebauer Model", presented at the 1993 IS&T and SID's Color Imaging Conference on Transformation & Transportability of Color and in the article by Kang H. R., "Applications of color mixing models to electronic printing", Journal of Electronic Imaging 3(3), Jul. 1994.

Inversion of Neugebauer equations by means of iterative methods

The Neugebauer equations predict color from colorant. Separation is involved with the opposite transformation. Several methods have been known to achieve this "model inversion", and all of them are based on an iterative search that converges to the desired solution. One example is the Newton Raphson inversion method. Since the derivative of the Neugebauer equations exists and is easily calculated, Newton Raphson iteration can be used. The values of $c_1$, $c_2$ and $c_3$ in the $(i+1)^{th}$ iteration are found from the values in the $i^{th}$ iteration as follows:

$$\begin{bmatrix} c_1 \\ c_2 \\ c_3 \end{bmatrix}_{i+1} = \begin{bmatrix} c_1 \\ c_2 \\ c_3 \end{bmatrix}_i + \begin{bmatrix} \Delta c_1 \\ \Delta c_2 \\ \Delta c_3 \end{bmatrix}$$

in which the corrections $\Delta c_1$, $\Delta c_2$ and $\Delta c_3$ are found by solving the set of linear equations:

$$\begin{bmatrix} \partial X/\partial c_1 & \partial X/\partial c_2 & \partial X/\partial c_3 \\ \partial Y/\partial c_1 & \partial Y/\partial c_2 & \partial Y/\partial c_3 \\ \partial Z/\partial c_1 & \partial Z/\partial c_2 & \partial Z/\partial c_3 \end{bmatrix}_i \begin{bmatrix} \Delta c_1 \\ \Delta c_2 \\ \Delta c_3 \end{bmatrix}_i = \begin{bmatrix} \Delta X \\ \Delta Y \\ \Delta Z \end{bmatrix}_i$$

The values, $\Delta X$, $\Delta Y$ and $\Delta Z$ represent the differences between the XYZ values of the desired color and the color that is predicted by the Neugebauer model for $c_1$, $c_2$ and $c_3$ in the ith iteration. The iteration is stopped when the values of $c_1$, $c_2$ and $c_3$ have become stable.

The Newtonian iteration converges quickly to the desired solution provided that a reasonable start value was selected. Simple as this sounds, however, this is not always obvious, and several complications may occur.

A first problem relates to the possibility that at some point in the iteration at least one of the partial derivatives of the color components becomes zero or very small. A typical example of this occurs in the cmy process in that part of the colorant space where each of the three colorant components is near its maximum value (100%): the Y color component varies very little for changes $\Delta c$, $\Delta m$ and $\Delta y$ on the amounts of colorants c, m or y in that case. A situation like this can bring the set of equations to near singularity, and can result in overly large corrections $\Delta c$, $\Delta m$ and $\Delta y$ for the colorants, causing the iteration to diverge. This is not unsimilar to the example of the Newton Raphson iteration on a 1-dimensional function in FIG. 3.

Lesser known and certainly lesser understood are the problems that can occur with the model inversion of a 3-ink process where the same color can be rendered with more than one set of colorants. As FIG. 4 shows, the graphical interpretation of this situation is that the three surfaces that correspond to each of the Neugebauer equations have more than one intersecting point in the colorant gamut. The drawing was based on the behavior of a printing process with cyan, yellow and green inks on a white substrate.

It is true that the existence of multiple solutions, that fall within the colorant gamut, is relatively uncommon for "well-behaved" printing processes such as the cmy offset printing process, and this explains probably why the problem has not got much attention up till now. Our experience shows, however, that multiple solutions are far less exceptional when unconventional processes are to be modeled. Examples include a thermal dye sublimation process where above certain dye concentrations in the substrate an "inverse" flow of dye occurs, leading to non-monoticity and double solutions for certain colors. Another example is the printing process used in many commercial telephone directories where cyan, magenta and black inks are used to print on a yellow substrate. It can be readily understood, even intuitively, that more than one combination of the three colorants can be found that yields certain colors. Yet another example is found in the field of the "HiFi color printing" processes where, besides cyan, magenta, yellow and black inks, in addition red, green and blue inks are used: the 3-ink process where, for example, cyan, yellow and green inks are printed in the presence of magenta ink leads to "multiple solutions" for certain colors. Model inversion of the above processes by means of iterations would lead to different sets of colorants depending on which "start vector" is used. This effect becomes problematic as images with continuous color transitions can be separated into colorant transitions that are discontinuous. At the transitions where the separations "jump" from one solution to the other, even small register variations would manifest these discontinuities as disturbing artifacts.

Opposite to the case of having multiple solutions is the case that the inversion of a set of Neugebauer equations has no (real) solution at all. Indeed, as intuition tells and as a more rigorous mathematical analysis would confirm, not all of the XYZ color space can be "addressed" from the $c_1$, $c_2$ and $c_3$ colorant space, even if the colorant values are allowed to vary from minus to plus infinity. Inversely is it possible that an XYZ color is offered to the iteration process for which no (real) set of colorants exists, and hence will an iteration process for such an XYZ color never converge. The graphical interpretation of this case is that the three surfaces that correspond to each of the Neugebauer equations have no intersection at all. It may look senseless to try to separate an XYZ color for which no set of colorants exists, but the truth is that this is not always known in advance. Many methods, for example, that are used to calculate the reproducible color gamut of a printing process try to separate a large set of XYZ colors, including colors for which no set of colorants exists. All the above problems become only worse when higher order models than the "simple Neugebauer equations" are used for the sake of better precision: the additional inflection points that are introduced by the higher order terms only increase the chances of multiple solutions or divergence caused by local extremes. Depending on the start vector one or the other solution is found or, in the worst case, no solution at all. Never is any information available on how many other solutions actually exist, what they are and which one should be retained.

Also with other inversion techniques such as simplex methods the same problems occur as with the inversion by means of Newtonian iteration, since they are related more to the printer behavior than to the inversion method. Local minimums can cause the minimization strategy to converge to the "wrong" set of colorants, and multiple solutions are usually not detected. No meaningful results are obtained if the model inversion is done for an XYZ color that has no colorant solution.

Calculation of separation look up tables.

The separation of a color into a set of colorants by means of any of the above techniques is a computationally intensive task. When large numbers of colors are to be separated, as is the case for the separation of high resolution images, look up tables and interpolation techniques are used. The look up tables have a 3-dimensional address space of which the axes are related to the color coordinates of the image. With every addressable position in the table corresponds a set of colorants that are calculated off line by means of one of the above strategies. More information of the use of look up tables for this purpose is found in the U.S. Pat. Nos. 3,893,166, 4,334,240, 4,751,535, EP 0,550,212 and DE 42 34 985, and in the article by Kanamori "Color Correction Technique for Hard Copies by 4-Neighbors Interpolation Method", Journal of Imaging Science and Technology, Vol. 36, No. 1, Jan./Feb..

A special problem occurs in these tables when two neighboring addressable positions are filled in with colorant values that correspond to discontinuous solutions of the Neugebauer equations. A very large error on the printed color can originate when interpolation is used to obtain the colorant values for a color that lies in between these addressable positions.

OBJECTS OF THE INVENTION

It should be clear from the above explanation that the inversion of the Neugebauer equations by means of the existing techniques does not always converge to a representative set of colorants, and that this can lead to discontinuities and color error when images are separated or look up tables are calculated for that purpose. The problems are particularly manifest in the case of separations for "unconventional printing processes". Therefore a need exists for a more robust solution that, under all conditions, finds all the colorant sets that render a given color and then retains one of them based on some criterion. Such a method is the object of our invention. More specifically, It is an object of the invention to find the number of possible sets of colorants for the rendering of a color by means of an n-ink process in which n is equal to or lower than the dimension of the color space.

It is another object of the invention to find these combinations of colorants.

It is another object of the invention to select at least one of the combinations of colorants that yields the specified color.

It is another object of the invention to select a set of colorant combinations by minimizing a cost function if the dimension of the colorant space is larger than the dimension of the color space.

It is another object of the invention to provide an improved separation technology that avoids discontinuities in separated color images.

It is another object of the invention to find the colorant set for the rendering of a given color that yields the smallest change in color in the presence of variations on the amounts of colorant.

It is another object of the invention to provide a robust method for the inversion of the Neugebauer model for up to three colorants in a 3-dimensional color space.

It is another object of the invention to provide a robust method for the inversion of the localized Neugebauer equations for up to three colorants in a 3-dimensional color space.

It is another object of the invention to provide a robust method for the inversion of the Neugebauer model for n colorants (n>=3) in a 3-dimensional color space.

It is another object of the invention to provide a robust method for the inversion of the localized Neugebauer equations for n colorants (n>=3) in a 3-dimensional color space.

Further objects and advantages of the invention will become apparent from the description hereinafter.

SUMMARY OF THE INVENTION

The above mentioned objects are realised by the specific features according to claim 1. Preferred embodiments of the invention are disclosed in the dependent claims.

In the broadest sense, Neugebauer cells are solids, as a portion from a colorant space, such that each point belonging to the colorant gamut belongs to at least one Neugebauer cell. Such Neugebauer cells may thus have common points, regions or solids. In a specific embodiment, the Neugebauer cells partition the colorant gamut in mutually disjunctive portions. This means that the intersection between each two Neugebauer cells is empty or comprises at most one surface. In a more preferred embodiment, each Neugebauer cell is a cuboid, i.e. a rectangular parallelepiped. A specific embodiment of a cuboid is a cube. The colorant gamut may be split cubes, all having the same size. In the broadest sense, "Neugebauer equations" as referred to in the current invention are equations having at least one non-linear term. A non-linear term is e.g. a quadratic term, cubic, etc. or a cross-product between two or more linear variables (e.g. $c_1 * c_2$). All sets of equations, all having constant or linear terms only, are excluded from the concept of "Neugebauer equations".

Preferentially, Neugebauer equations are polynomials that express color values in terms of bilinear, trilinear or quadratic colorant values. In a specific embodiment, Neugebauer equations are limited to the formulae for X, Y and Z given under the title "The Neugebauer equations" in the background of the invention, which are referred to as trilinear equations.

One of the key elements of our invention is a new and robust method for finding all the colorant sets, including both the "real" and the "complex" solutions, that render a given color specified in a 3-dimensional space for a process that is modeled with the Neugebauer equations for three colorants. The "complex" solutions have obviously no physical interpretation, neither do these real solutions in which at least one colorant falls outside the colorant gamut. These solutions are therefore omitted and need no further consideration. The number of remaining solutions indicates how many colorant sets exist to render the given color. This number can be zero, one or it can be more than one. If the number is more than one, the set of colorants is selected that optimizes an additional criterion. According to a first embodiment, this criterion is the amount of color change that results in the presence of colorant variations. According to a second embodiment, the one colorant solution is retained that is connective to the colorant solutions for the colors along a selected path in color space.

To invert the Neugebauer equations for an n-ink process with n>3, preferentially n-3 colorants are considered as parameter and the n-ink model will be reduced to a Neugebauer process for three colorants that can be inverted by making use of the previous method. The choice of the colorant set to render a given color is obtained by minimizing a cost function.

The previous results can be extended for the localized Neugebauer model and hence by approximating a printer model with the localized Neugebauer model, it is possible to invert any n-ink process.

DETAILED DESCRIPTION OF THE INVENTION

Figure 1:
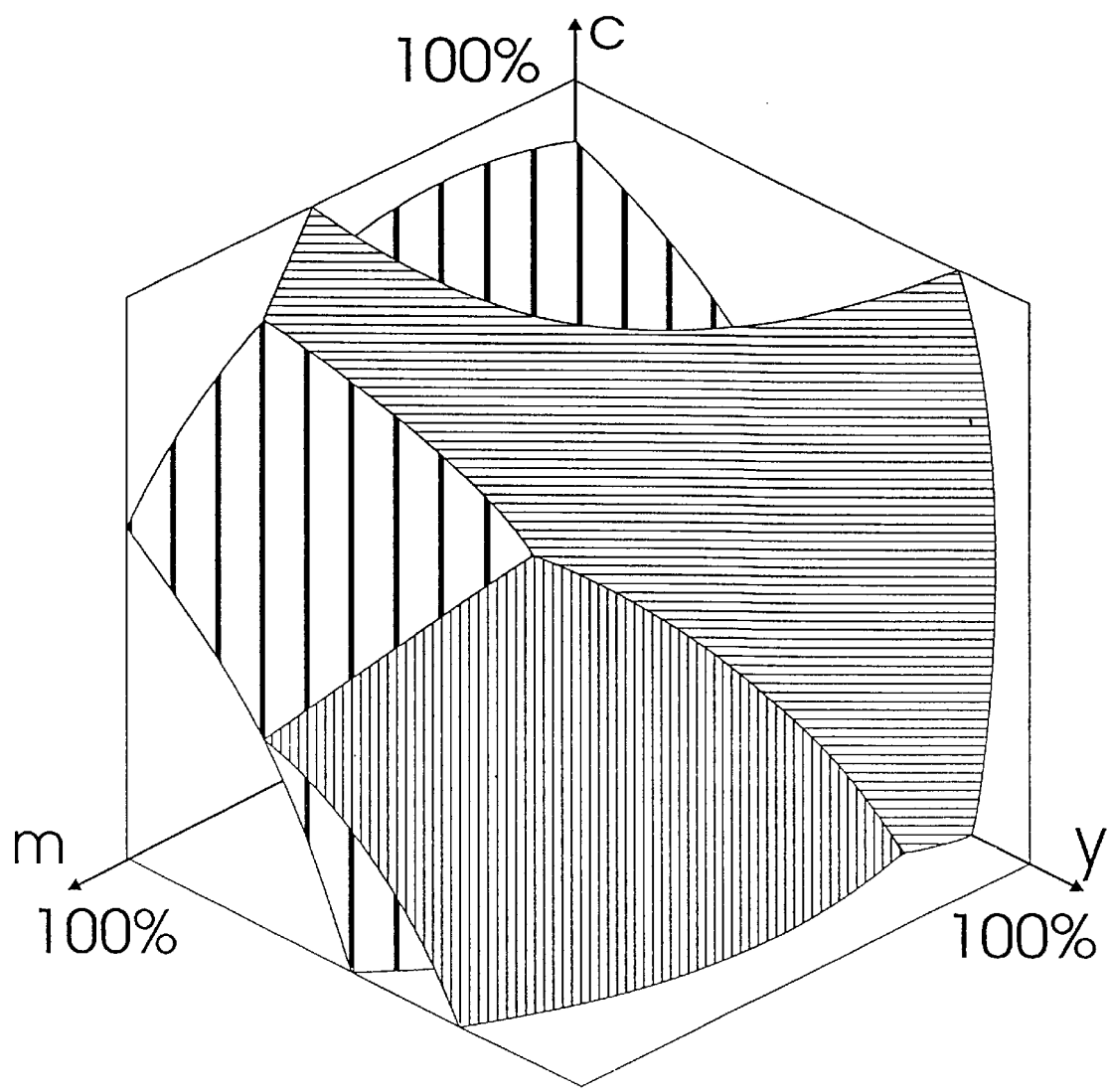

The invention is described hereinafter by way of examples with reference to the accompanying figures wherein:

FIG. 1 For a given X, Y and Z, each of the three Neugebauer equations represents a "surface" in the 3-dimensional $c_1$, $c_2$, $c_3$ space. The solution of the Neugebauer equations for a given X, Y and Z value can be seen as the intersection between the three surfaces that correspond to these values. In this example a cmy process is presented. The axis pointing to the right corresponds to yellow (y), the axis pointing to the left corresponds to magenta (m) and the third axis pointing upwards is cyan (c).

Figure 2:
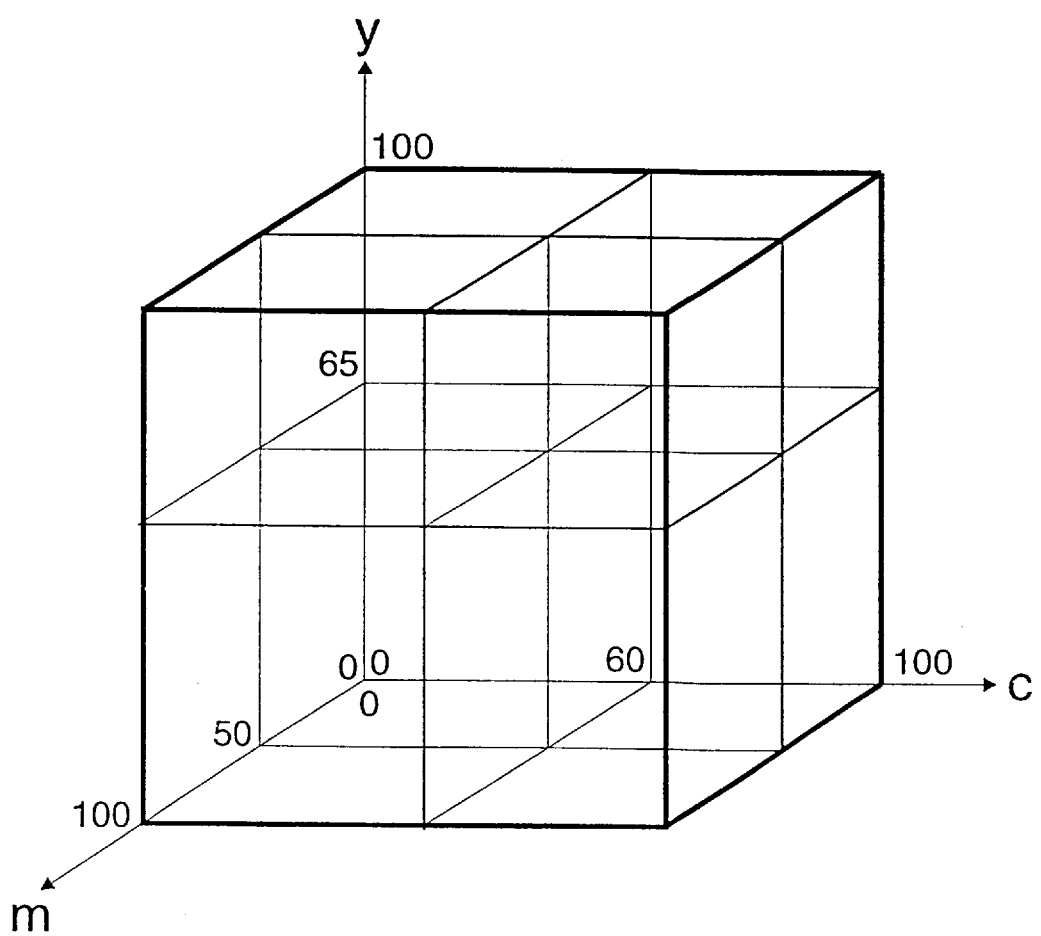

FIG. 2 The division of the colorant cube of a cmy process in 8 Neugebauer cells.

Figure 3:
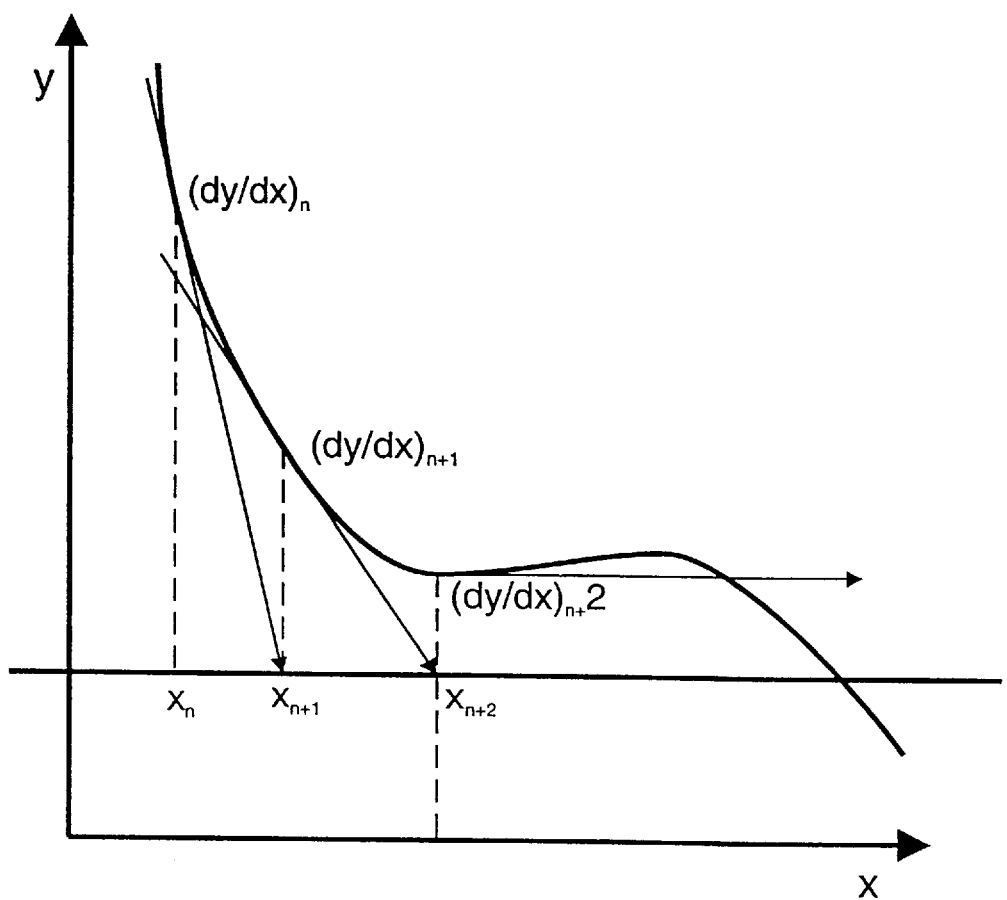

FIG. 3 Newton Raphson iteration on one dimensional function. The iteration diverges because a point is hit in which the derivative has a zero value.

Figure 4:
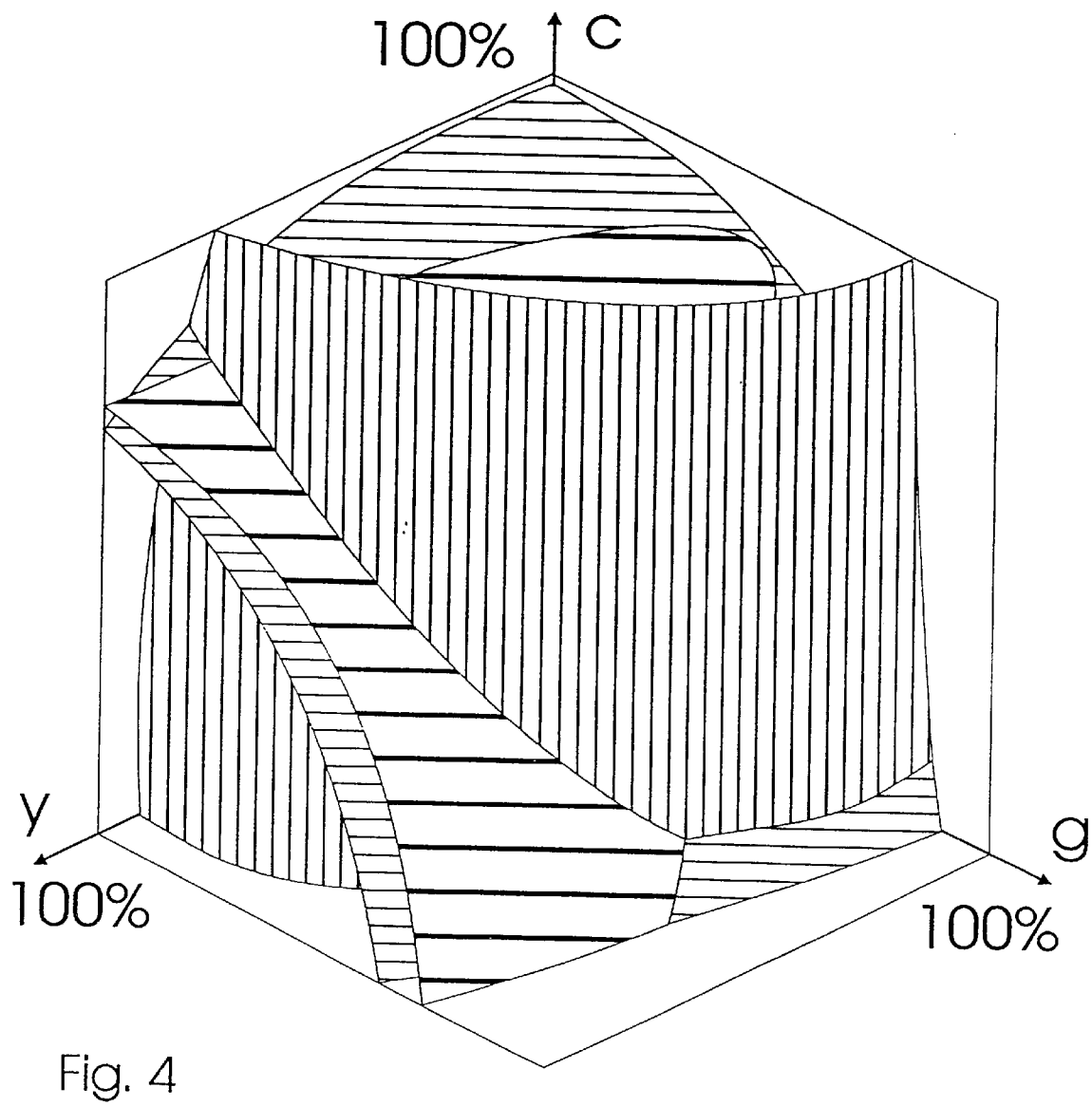

FIG. 4 Example of a case where the three surfaces corresponding to the Neugebauer equations have more than one intersecting point. In this example surfaces in colorant space corresponding to constant tristimulus values for a yellow, green and cyan ink process modeled by the Neugebauer equations are represented. The axis pointing to the right corresponds to g, the axis pointing to the left corresponds to y and the third axis pointing upwards is c.

Figure 5:
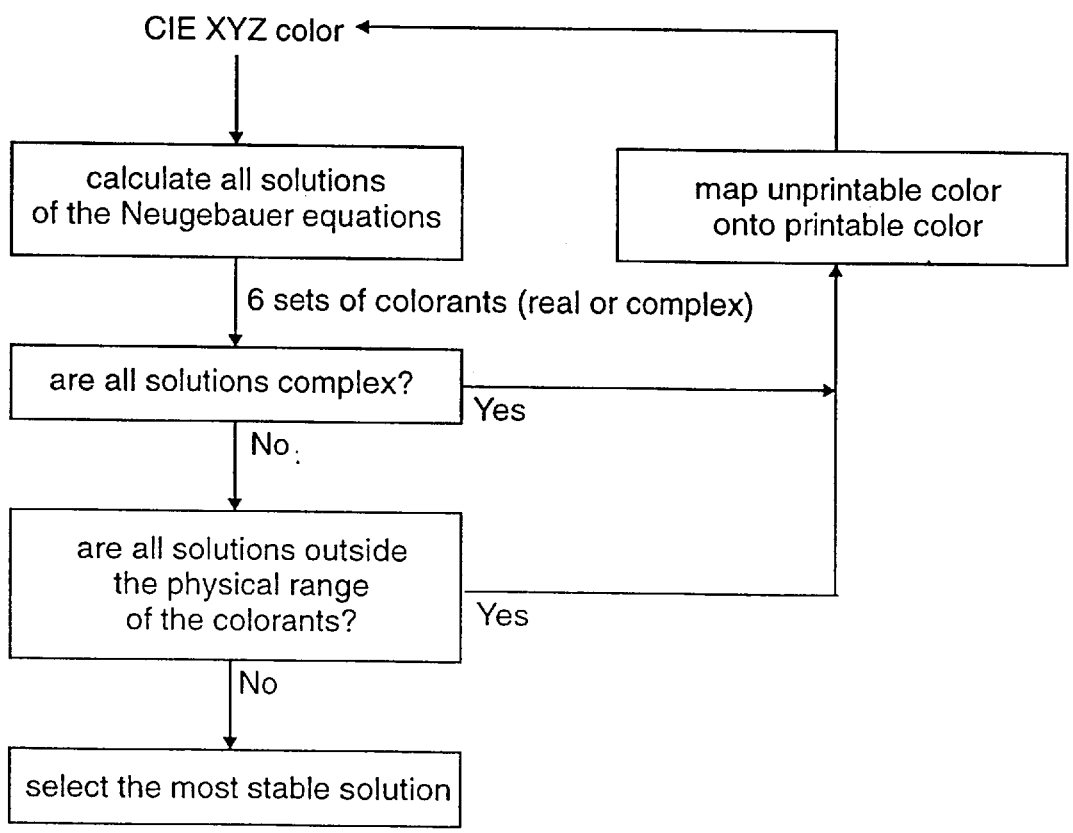

FIG. 5 The section procedure of the colorant combination resulting in the most stable color rendering for a 3-ink process modeled with the Neugebauer equations.

While the present invention will hereinafter be described in connection with preferred embodiments thereof, it will be understood that it is not intended to limit the invention to those embodiments. On the contrary, it is intended to cover all alternatives, modifications, and equivalents as may be included within the spirit and scope of the invention as defined by the appending claims.

In the following paragraphs, printer models are inverted for colors represented in a 3-dimensional space.

For up to three colorants, the inversion of the Neugebauer equations is presented. This solution can be extended for the localized Neugebauer equations and hence by approximating a printer model with the Neugebauer equations the inversion of any printer model is obtained. In the case of multiple solutions, a selection mechanism is presented.

For four colorants, one colorant is considered as a parameter. This colorant is sampled between a minimum and maximum value and per sample point a 3-ink process is extracted from the 4-ink process by setting the colorant to its sampled value. To choose one colorant set, a given cost function is minimized. The methods to invert the Neugebauer equations, the localized Neugebauer equations and a general printer model are presented and several examples of cost functions are given.

In the case of n colorants, n−3 colorants are considered as parameters, and per sample point in an n−3 dimensional colorant space a 3-ink process is inverted. Of all these colorant solutions, that solution is retained for which a given cost function is minimized.

Inversion of a 3-ink process

Neugebauer equations

This solution is based on the observation that the set of Neugebauer equations for three colorants can be transformed into a 6th degree polynomial in one variable, and that robust numerical algorithms exist that, under all conditions, find all the roots (real and complex) of such a polynomial. The Neugebauer equations are here represented in the XYZ color space, but any other set of color coordinates in a 3-dimensional space can be used. The derivation of the $6^{th}$ degree polynomial is presented here: By considering $c_3$ as a parameter, the original Neugebauer equations can be rewritten as:

$$X = (k_0 + k_3 c_3) + (k_1 + k_{13} c_3) c_1 + (k_2 + k_{23} c_3) c_2 + (k_{12} + k_{123} c_3) c_1 c_2$$

$$Y = (l_0 + l_3 c_3) + (l_1 + l_{13} c_3) c_1 + (l_2 + l_{23} c_3) c_2 + (l_{12} + l_{123} c_3) c_1 c_2$$

$$M = (m_0 + m_3 c_3) + (m_1 + m_{13} c_3) c_1 + (m_2 + m_{23} c_3) c_2 + (m_{12} + m_{123} c_3) c_1 c_2$$

Using the following definitions:

$K_0 = k_0 + k_3 c_3$    $L_0 = l_0 + l_3 c_3$    $M_0 = m_0 + m_3 c_3$ $K_1 = k_1 + k_{13} c_3$    $L_1 = l_1 + l_{13} c_3$    $M_1 = m_1 + m_{13} c_3$ $K_2 = k_2 + k_{23} c_3$    $L_2 = l_2 + l_{23} c_3$    $M_2 = m_2 + m_{23} c_3$ $K_{12} = k_{12} + k_{123} c_3$    $L_{12} = l_{12} + l_{123} c_3$    $M_{12} = m_{12} + m_{123} c_3$ the Neugebauer equations can be simplified to:

$$X = K_0 + K_1 c_1 + K_2 c_2 + K_{12} c_1 c_2$$

$$Y = L_0 + L_1 c_1 + L_2 c_2 + L_{12} c_1 c_2$$

$$Z = M_0 + M_1 c_1 + M_2 c_2 + M_{12} c_1 c_2$$

This is a set of three equations with two variables. Assuming that $M_{12}$ is different from zero, the product $c_1 c_2$ in the above equation can be eliminated:

$$(K_0 - X) M_{12} - (M_0 - Z) K_{12} + c_1 (K_1 M_{12} - M_1 K_{12}) + c_2 (K_2 M_{12} - M_2 K_{12}) = 0$$

$$(L_0 - Y) M_{12} - (M_0 - Z) L_{12} + c_1 (L_1 M_{12} - M_1 L_{12}) + c_2 (L_2 M_{12} - M_2 L_{12}) = 0$$

and, using the following definitions:

$A_0 = (K_0 - X) M_{12} - (M_0 - Z) K_{12}$    $B_0 = (L_0 - Y) M_{12} - (M_0 - Z) L_{12}$ $A_1 = (K_1 M_{12} - M_1 K_{12})$    $B_1 = (L_1 M_{12} - M_1 L_{12})$ $A_2 = (K_2 M_{12} - M_2 K_{12})$    $B_2 = (L_2 M_{12} - M_2 L_{12})$ the previous equation can be compactly rewritten as:

$$A_0 + c_1 A_1 + C_2 A_2 = 0$$

$$B_0 + c_1 B_1 + C_2 B_2 = 0$$

The solutions of these equations are immediately found using Cramer's rule:

$$c_1 = \frac{A_2 B_0 - A_0 B_2}{A_1 B_2 - A_2 B_1}$$

$$c_2 = \frac{A_0 B_1 - A_1 B_0}{A_1 B_2 - A_2 B_1}$$

By filling in $c_1$ and $c_2$ in the third expression of the simplified Neugebauer equations, i.e $$Z = M_0 + M_1 C_1 + M_2 c_2 + M_{12} c_1 c_2$$

and working out the terms, the following $6^{th}$ degree polynomial in $c_3$ is obtained:

$(M_O - Z) det(D) (L_1 K_2 - K_1 L_2) +$ $(K_O - X) det(D) (M_1 L_2 - L_1 M_2) + (L_O - Y) det(D) (K_1 M_2 - M_1 K_2) +$ $(K_O - X)^2 (L_2 M_{12} - L_{12} M_2) (L_{12} M_1 - L_1 M_{12}) +$ $(L_O - Y)^2 (K_{12} M_2 - K_2 M_{12}) (K_1 M_{12} - K_{12} M_1) +$ $(M_O - Z)^2 (K_2 L_{12} - K_{12} L_2) (K_{12} L_1 - K_1 L_{12}) +$ $(K_O - X) (L_O - Y) [(L_2 M_{12} - L_{12} M_2) (K_1 M_{12} - K_{12} M_1) +$ $(K_{12} M_2 - K_2 M_{12}) (L_{12} M_1 - L_1 M_{12})] +$ $(K_O - X) (M_O - Z) [(L_2 M_{12} - L_{12} M_2) (L_1 K_{12} - L_{12} K_1) +$ $(K_2 L_{12} - K_{12} L_2) (L_{12} M_1 - L_1 M_{12})] +$ -continued $$(L_O - Y)(M_O - Z)\,[(K_{12}M_2 - K_2M_{12})\,(L_1K_{12} - L_{12}K_1) +$$

$$(K_2L_{12} - K_{12}L_2)\,(K_1M_{12} - K_{12}M_1)] = 0$$

in which det(D) refers to the determinant of the matrix D:

$$D = \begin{bmatrix} K_1 & K_2 & K_{12} \\ L_1 & L_2 & L_{12} \\ M_1 & M_2 & M_{12} \end{bmatrix}$$

This polynomial in $c_3$ has up to six roots, some of which can be complex. They can all be found by means of, for example, the "Laguerre" algorithm presented in William H. Press, Saul A. Teukolsky, William T. Vetterling, Brian P. Flannery, "Numerical Recipes in C", Cambridge University Press, 1992, Chapter 9.5. The corresponding values for $c_1$ and $c_2$ are found by filling in the roots $c_3$ of the polynomial in the expressions $$c_1 = \frac{A_2B_0 - A_0B_2}{A_1B_2 - A_2B_1}$$

$$c_2 = \frac{A_0B_1 - A_1B_0}{A_1B_2 - A_2B_1}.$$

This leads to up to six triplets of $c_1$, $c_2$ and $c_3$ that meet the Neugebauer equations.

If $K_i$, $L_j$ and $M_k$ are interchanged, exactly the same equations are obtained. From this follows that the roots of the $6^{th}$ degree polynomial correspond to the solutions of the Neugebauer equations provided that $K_{12} \neq 0$ or $L_{12} \neq 0$ or $M_{12} \neq 0$.

A special case occurs if a root would be found for which $K_{12}=L_{12}=M_{12}=0$. This root would not necessarily be a solution of the original Neugebauer equations. In order to find out if this special case occurs, it is evaluated if for one of the roots of the 6th degree $K_{12}=L_{12}=M_{12}=0$. Only if this is NOT the case, the root is also a solution of the Neugebauer equations. Otherwise the solution of the Neugebauer equations has to be searched by filling in the root value in the original Neugebauer equations, which in that case can be simplified to:

$$X = k'_0 + k'_1 c_1 + k'_2 c_2 + k'_{12} c_1 c_2$$

$$Y = l'_0 + l'_1 c_1 + l'_2 c_2 + l'_{12} c_1 c_2$$

$$Z = m'_0 + m'_1 c_1 + m'_2 c_2 + m'_{12} c_1 c_2$$

If one of the coefficients of the cross terms $c_1 c_2$ is different form zero, suppose $m'_{12}$, the cross terms in $c_1 c_2$ can be eliminated in the first two equations. In this way a set of two linear equations are obtained in two variables, that can be solved using standard mathematical procedures. Only if for this $c_1 c_2$-solution also the last equation is met, it is a solution for the Neugebauer equations. A similar procedure can be applied if $m'_{12}$ would be zero and one of the coefficients $k'_{12}$ or $l'_{12}$ is different from zero. If all the coefficients of the cross terms $c_1 c_2$ are zero, a set of linear equations are obtained that can be solved by making use of standard methods.

It can be verified that all cases where at least one of the coefficients of the cross products between two colorants in the original Neugebauer equations are non zero, can be solved similarly by taking the remaining colorant as the parameter. In all other cases, the Neugebauer equations degenerate to a set of linear equations that can be solved using straightforward techniques. The above explanation can be summarized as follows: the Neugebauer equations for a 3-ink process can be converted into a $6^{th}$ degree polynomial in one variable. Robust numerical methods exist to find the six roots of such a polynomial which can be real or complex conjugated. The roots of this polynomial correspond to six sets of three colorants with which a given color can be rendered if the Neugebauer equations are used as printer model. Hence the questions are answered how many solutions exist for the Neugebauer equations and what these solutions are.

A Neugebauer process with less than three inks can be considered as a Neugebauer process with three colorants but a number of coefficients in the Neugebauer equations will be zero. Hence a Neugebauer process with less than three inks can also be inverted by making use of the inversion of a 3-ink Neugebauer process.

Localized Neugebauer equations

To invert the localized Neugebauer equations with up to three colorants, for each Neugebauer cell the equations are inverted and the real solutions that fall within the corresponding cell are retained. All these solutions are colorant sets that result in the required color. In most situations, a given color can only be obtained with one colorant combination. However, for some processes several solutions are found that belong to the same or different Neugebauer cells.

General printer model

Any printer model can be approximated by making use of the localized Neugebauer equations with any accuracy if a sufficient number of Neugebauer cells are used. Therefore it is possible to invert every printer model by approximating this model with the localized Neugebauer equations and inverting these equations.

EXAMPLE

By means of an example, it is demonstrated that the Newtonian iteration can sometimes "miss" the solution that is searched for. The following set of equations was obtained from measurements of a cmyk offset printing press. It predicts the XYZ color as a function of black ($c_1$), cyan ($c_2$) and magenta ($c_3$) colorants in combination with a fixed value of 100% for the yellow colorant. The coefficients are "localized" and are only valid within the following ranges of the colorant values (in this paragraph the colorant values range from 0 to 1.0):

$0.2 < c_1 < 0.4$ $0.0 < c_2 < 0.1$ $0.7 < c_3 < 1.0$

| | | |
|---|---|---|
| $k_0 = 59.72$ | $l_0 = 55.47$ | $m_0 = 5.64$ |
| $k_1 = -26.74$ | $l_1 = -37.10$ | $m_1 = -2.93$ |
| $k_2 = -59.38$ | $l_2 = -30.10$ | $m_2 = 14.22$ |
| $k_3 = 9.75$ | $l_3 = 5.06$ | $m_3 = -16.69$ |
| $k_{12} = -75.58$ | $l_{12} = -66.93$ | $m_{12} = -4.76$ |
| $k_{13} = 33.38$ | $l_{13} = 44.82$ | $m_{13} = 3.19$ |
| $k_{23} = 73.89$ | $l_{23} = 25.04$ | $m_{23} = -26.44$ |
| $k_{123} = 3.75$ | $l_{123} = 14.06$ | $m_{123} = 30.94$ |

The equations predict that if the colorant values are set to $c_1 = 0.20$ $c_2 = 0.00$ $c_3 = 1.00$ the resulting XYZ color is equal to:

X=24.54

Y=13.95

Z=2.40

The inversion of the Neugebauer equations by means of Newtonian iteration with starting values: $c_1=c_2=c_3=0.5$ leads to the following solution for the colorants:

$c_1=0.38$ $c_2=-0.36$ $c_3=0.99$

By filling in these values in the equations it can be verified that, although not physically realizable, this is indeed a valid solution from the mathematical point of view.

Inversion of the equations by means of polynomial root finding leads to the following four solutions (only the real solutions are retained):

| $c_1 =$ | 0.38 | $c_1 =$ 0.20 | $c_1 =$ 0.58 | $c_1 =$ 0.83 |
|---|---|---|---|---|
| $c_2 =$ | -0.36 | $c_2 =$ 0.00 | $c_2 =$ 1.06 | $c_2 =$ 0.04 |
| $c_3 =$ | 0.99 | $c_3 =$ 1.00 | $c_3 =$ 5.14 | $c_3 =$ 18.69 |

The first solution is the one to which the Newtonian iteration had converged to. Only the second solution falls within the colorant gamut. In addition two other (non physically realizable) solutions were found. A pair of two complex conjugated solutions is not shown.

Selection mechanism for one set of colorant values

To separate a color into colorants, only one set of colorants is needed. Given the fact that the above method produces up to six solutions of the Neugebauer equations, a selection criterion is needed to determine which solution is used for the separation of color into colorant.

In a first step the pairs of complex conjugated solutions that were found are rejected, since they do not correspond to physically realizable colorant sets. In the case that all solutions are complex conjugated, the color lies in that part of the color space that can "not be addressed" by the Neugebauer equations from colorant space. It is hence unprintable and for its rendering, it needs to be mapped onto a printable color. Examples of techniques to do so are described in U.S. Pat. No. 4,500,919. The gamut boundaries that are described in this patent can for example be calculated by means of the techniques described in the article by M. Inui "A Fast Algorithm for Computing Color Gamuts" (Color Research and Application, Vol. 18, No. 5, Oct. 1993).

In a second step, these solutions of the Neugebauer equations are retained that fall inside the colorant gamut. For offset printing processes, e.g., this range is usually from 0 to 100%. Assuming that the color is indeed a printable color, at least one such set of colorants exists with this property. If no such solution is found, the color is unprintable and for rendering needs to be mapped onto a printable color.

Till now, only solutions are retained that are both real and fall within the colorant gamut. In principle, any of these sets of colorants can be used for the correct rendering of the color, and the selection of one of them always contains an arbitrary element. Two approaches are presented here but many more exist and fall within the spirit and the scope of the invention.

According to a first approach that solution is selected that yields the most stable rendering of the color on the printer. With most stable rendering is meant that set of colorants that in the presence of incremental changes on the colorant values yields the smallest change in color. The change of color as a result of colorant changes is easily calculated by evaluating the total derivative of the forward Neugebauer model for the particular colorant set, i.e.

$$\begin{pmatrix} \partial X \\ \partial Y \\ \partial Z \end{pmatrix} = \begin{pmatrix} \partial X/\partial c_1 & \partial X/\partial c_2 & \partial X/\partial c_3 \\ \partial Y/\partial c_1 & \partial Y/\partial c_2 & \partial Y/\partial c_3 \\ \partial Z/\partial c_1 & \partial Z/\partial c_2 & \partial Z/\partial c_3 \end{pmatrix} \begin{pmatrix} \partial c_1 \\ \partial c_2 \\ \partial c_3 \end{pmatrix}$$

By calculating the singular value decomposition (SVD) of the previous 3×3 matrix, an orthogonal axis transformation is performed in such a way that one of the new axes lies along the maximum color change for a unit change in the colorant space. That color change corresponds to the largest singular value, because it is expressed in color units per unit colorant change (the normal Euclidean distance measure is used in both colorant and color space). The colorant combination for which the largest singular value is the smallest is retained. The selection of the colorant combination resulting in the most stable color rendering is presented in the flowchart in FIG. 5. The SVD of a matrix can be calculated using the method presented in William H. Press, Saul A. Teukolsky, William T. Vetterling, Brian P. Flannery, "Numerical Recipes in C", Cambridge University Press, 1992.

According to a second approach, continuity of the colorant changes is given preference along certain paths in color space. Especially in areas of smooth tone and color transitions, abrupt spatial changes in colorant values are highly undesirable since they create visible artifacts in the presence of misregistration between the colorant planes. For a cmy printing process, for example, this can be translated into the requirement to make the rendering of degrades from white to cm, cy and my and from cmy to cm, cy and my as smooth as possible. In the subsequent calculation of the colorant values for the rendering of such color paths, always the set of colorants that differs the least (in terms of least mean square) from the set of colorants at the previous point on the path is selected. The same principle can be used when the points of a 3-dimensional separation look up table are to be filled in.

Inversion of a 4-ink process
Neugebauer equations

Because the Neugebauer equations are continuous functions, there may be up to six paths in colorant space that result in the same color. This can be seen as follows. If the fourth colorant is kept constant, there may be up to six solutions to render a given color. By varying the fourth color infinitesimally, the previous six solutions will also be changed infinitesimally due to the continuous relations between the color values and colorants. Hence by changing the fourth colorant, six paths are obtained in the colorant space that result in a given color.

To select one colorant combination, the minimum and maximum value for one colorant is determined with which a given color can be achieved. These values can for example be calculated by inverting all the extracted boundary 3-ink processes of the 4-ink process for the given color. Per colorant, the minimum and maximum value of all these colorant solutions is the minimum and maximum value of this colorant with which the given color can be reached. The six paths can now be sampled by choosing a value for one colorant between its minimum and maximum value, extracting the 3-ink process by filling out this value in the 4-ink process, and inverting the extracted 3-ink process for the given color. From all these colorant combinations that fall inside the colorant gamut the one set is retained for which a given cost function is minimum. Several examples of cost functions are:

Most stable rendering: In the case of a 4-ink process the relation between color changes and colorant changes is expressed with a 3×4 matrix. The colorant set for which the largest singular value is minimum is retained.

Minimum colorant: the colorant combination for which a given colorant value is minimum Maximum colorant: the colorant combination for which a given colorant value is maximum Percentage colorant: the colorant combination for which a given color corresponds with a percentage between its minimum and maximum value Minimum colorant sum: the colorant combination for which the sum of the colorants is minimum Maximum colorant sum: the colorant combination for which the sum of the colorants is maximum Equal colorants: the colorant combination for which the difference between the colorant values is as small as possible Moire: the colorant combination that is the least sensitive to moire Path: choosing one path out of the six that results in the given color and applying a cost function to select one colorant combination on this path.

Continuity: colorant combinations are chosen in such a way that continuous color changes are separated into continuous colorant changes.

It is clear that this list of cost functions is unlimited and that many more cost functions exist that fall within the scope and the spirit of this invention.

Localized Neugebauer equations

The previous method can be extended for the localized Neugebauer equations with four colorants. Per Neugebauer cell there may be up to 6 paths that map to the same color in color space and hence there may be several paths in the colorant domain that result in the given color if all paths in the Neugebauer cells are taken together. However, because the localized Neugebauer equations are continuous functions, there will be paths of neighboring cells that are connected with each other.

To calculate the minimum and maximum value of a colorant to obtain a given color, a distinction has to be made about the behavior of the printer. For well-behaved processes, such as a cmyk offset printing press, the minimum and maximum value of a colorant to form a given color can be found by determining the extracted boundary 3-ink processes of the localized Neugebauer and inverting these extracted boundary 3-ink processes for the given color. Per colorant, the minimum and maximum value of these colorant solutions are the minimum and maximum value for this colorant with which the given color can be reached. For some unconventional processes however, previous procedure has to be applied per Neugebauer cell, i.e. determining the extracted boundary 3-ink processes and inverting these extracted boundary processes for the given color. Per colorant, the minimum and maximum colorant value of all the previous colorant solutions are the minimum and maximum value of these colorants with which the given color can be obtained.

Then, one colorant is sampled between its minimum and maximum value, the 3-ink process is extracted by filling out this value in the 4-ink process, and finally the extracted 3-ink process is inverted for the given color. From all these colorant combinations that set is retained that falls inside the colorant gamut of the n-ink process and for which a given cost function is minimum.

General printer model

Any printer model can be approximated by making use of the localized Neugebauer equations with any accuracy if a sufficient number of Neugebauer cells is used. Therefore it is possible to invert every printer model by approximating this model with the localized Neugebauer equations and inverting these equations.

Inversion of an n-ink process

Neugebauer equations

Previous methods can be generalized for any number of inks. The minimum and maximum colorant value to reproduce a given color is obtained by determining all the extracted boundary 3-ink processes of the n-ink process and inverting these extracted boundary 3-ink processes for the given color. Per colorant, the minimum and maximum value of all these colorant solutions are the minimum and maximum colorant value for this colorant to reproduce the given color.

For an n-ink process with n>3 there are n−3 degrees of freedom, and hence n−3 colorants will be considered as parameters, that can have colorant values between their minimum and maximum value with which a given color can be reached. This (n−3)-dimensional parameter space is sampled and the 3-ink process is extracted form the n-ink process by setting the (n−3) colorants in the printer model of the n-ink process to their sampling values. This extracted 3-ink process is inverted and for all the sampling points that solution is retained for which a given cost function is minimum, taking into account the colorant limitations of the colorant gamut of the n-ink process.

Localized Neugebauer equations

The previous method can be extended for the localized Neugebauer equations with n colorants.

To calculate the minimum and maximum value of a colorant to obtain a given color, a distinction has to be made about the behavior of the printer. For well-behaved processes, such as a cmyk offset printing press, the minimum and maximum value of a colorant to form a given color can be found by determining the extracted boundary 3-ink processes of the localized Neugebauer and inverting these extracted boundary 3-ink processes for the given color. Per colorant, the minimum and maximum value of these colorant solutions are the minimum and maximum value for this colorant with which the given color can be reached. For some unconventional processes however, previous procedure has to be applied per Neugebauer cell, i.e. determining the extracted boundary 3-ink processes and inverting these processes for the given color. Per colorant, the minimum and maximum colorant value of all the previous colorant solutions are the minimum and maximum value of these colorants with which the given color can be obtained.

Then, n−3 colorants are sampled between their minimum and maximum value, the 3-ink process is extracted by filling out these values in the printer model of the n-ink process, and finally the extracted 3-ink process is inverted for the given color. From all these colorant combinations, that set is retained that falls inside the colorant gamut of the n-ink process and for which a given cost function is minimum.

General printer model

Any printer model can be approximated by making use of the localized Neugebauer equations with any accuracy if a sufficient number of Neugebauer cells is used. Therefore it is possible to invert every printer model by approximating this model with the localized Neugebauer equations and inverting these equations.

Having described in detail preferred embodiments of the current invention, it will now be apparent to those skilled in the art that numerous modifications can be made therein without departing from the scope of the invention as defined in the following claims.

I claim:

1. Method of computing a set of colorant values for obtaining a given color by a color reproduction device comprising the following steps:

modeling said color reproduction device by Neugebauer equations;

finding a plurality of mutually different sets of colorant values by inversion of the Neugebauer equations for said color, each of said sets being representative of one individual solution of said Neugebauer equations for said given color;

selecting one set of colorant values from said plurality of sets.

2. Method according to claim 1, further comprising the following steps:

defining a colorant space;

dividing said colorant space in Neugebauer cells;

modelling said color reproduction device by a set of Neugebauer equations per Neugebauer cell;

finding a plurality of sets of colorant values by inversion of the Neugebauer equations for said color;

selecting one set of colorant values from said plurality of sets, said colorant values being comprised within the corresponding Neugebauer cell.

3. Method according to claim 1, further comprising the following steps:

extracting a 3-ink process from said Neugebauer equations;

transforming said 3-ink process to at least one polynomial in one variable;

inverting said 3-ink process by finding a plurality of roots of said polynomial.

4. Method according to claim 3, wherein said 3-ink process is extracted from an N-ink process by taking N−3 colorants as parameter.

5. Method according to claim 4, further comprising the following steps:

finding for at least one parameter a minimum and maximum colorant value, suitable for reproducing said given color;

sampling said parameter within a range between said minimum and said maximum.

6. Method according to claim 1, wherein said set is selected by minimisation of a cost function.

7. Method according to claim 1, further comprising the following steps:

rejecting complex or imaginary solutions;

rejecting solutions outside an established colorant space.

8. Method according to claim 1, wherein unprintable colors are mapped to printable colors within a color gamut of said color reproduction device.

9. Method according to claim 1, further comprising the following steps:

assessing for each set of colorant values a color change caused by incremental changes of colorant values;

selecting the set of colorant values with the smallest color change.

10. Method according to claim 1, further comprising the following steps:

selecting at least one continuous path in color space;

selecting the set of colorant values situated on a continuous path in colorant space, that is transformed to said path in color space by the Neugebauer equations.

11. Method according to claim 1, wherein said Neugebauer equations are trilinear polynomials.

12. Method according to claim 2, wherein said Neugebauer cells are mutually disjunctive and preferentially cuboid.

* * * * *